(12) United States Patent
Hamamura et al.

(10) Patent No.: US 7,704,402 B2
(45) Date of Patent: Apr. 27, 2010

(54) OPTICAL ELEMENT MANUFACTURING METHOD, OPTICAL ELEMENT, NIPKOW DISK, CONFOCAL OPTICAL SYSTEM AND 3-D MEASUREMENT DEVICE

(75) Inventors: Yutaka Hamamura, Yokohama (JP); Kiyoshi Kadomatsu, Odawara (JP); Noboru Amemiya, Chigasaki (JP)

(73) Assignee: Nikon Corporation, Tokyo (JP)

( * ) Notice: Subject to any disclaimer, the term of this patent is extended or adjusted under 35 U.S.C. 154(b) by 327 days.

(21) Appl. No.: 11/666,076

(22) PCT Filed: Oct. 24, 2005

(86) PCT No.: PCT/JP2005/019488

§ 371 (c)(1), (2), (4) Date: Apr. 24, 2007

(87) PCT Pub. No.: WO2006/046502

PCT Pub. Date: May 4, 2006

(65) Prior Publication Data

US 2008/0057273 A1    Mar. 6, 2008

(30) Foreign Application Priority Data

Oct. 27, 2004   (JP) .................... 2004-312805

(51) Int. Cl.
*C03C 15/00* (2006.01)
*B44C 1/22* (2006.01)

(52) U.S. Cl. ............... 216/24; 216/41; 216/42; 216/51; 216/57; 216/67; 216/74; 216/75; 216/79; 216/83; 216/96; 216/100; 216/108

(58) Field of Classification Search ............... None
See application file for complete search history.

(56) References Cited

U.S. PATENT DOCUMENTS

| 4,927,254 | A | * | 5/1990 | Kino et al. | ............... 359/235 |
| 5,067,805 | A | * | 11/1991 | Corle et al. | ............... 359/235 |
| 5,734,497 | A | * | 3/1998 | Yano et al. | ............... 359/368 |
| 5,737,084 | A | | 4/1998 | Ishihara | |
| 5,946,100 | A | * | 8/1999 | Ishihara | ............... 356/608 |
| 6,281,657 | B1 | * | 8/2001 | Matsuo | ............... 318/705 |
| 6,307,690 | B1 | * | 10/2001 | Czarnetzki et al. | ......... 359/837 |

FOREIGN PATENT DOCUMENTS

| JP | A 8-304998 | 11/1996 |
| JP | A 9-257440 | 10/1997 |
| JP | A 2001-083427 | 3/2001 |
| JP | A 2004-294805 | 10/2004 |

OTHER PUBLICATIONS

H.F.W. Dekkers, F. Duerinckx, J. Szlufcik, and J. Nijs, Silicon surface texturing by reactive ion etching, 2000, Opto-Electronics Review 8(4), p. 311-316, no. month available.*

* cited by examiner

*Primary Examiner*—Anita K Alanko
(74) *Attorney, Agent, or Firm*—Oliff & Berridge, PLC

(57) ABSTRACT

An optical element manufacturing method includes: disposing a light-shielding layer (14) that includes at least an Si layer as an uppermost layer, on a substrate (12) used as a base member, forming an optical aperture (14a) at the light-shielding layer (14) and forming a fine recession/projection structure (MR) at a surface of the uppermost layer through dry etching.

10 Claims, 9 Drawing Sheets

OPTICAL ELEMENT MANUFACTURING METHOD, OPTICAL ELEMENT, NIPKOW DISK, CONFOCAL OPTICAL SYSTEM AND 3-D MEASUREMENT DEVICE

TECHNICAL FIELD

The present invention relates to an optical element that may be used as a mask or the like assuring a reduced, level of reflection noise, a manufacturing method that may be adopted in manufacturing the optical element, a Nipkow disk representing an application example of the optical element, and a confocal optical system and a 3-D measurement device equipped with the Nipkow disk.

BACKGROUND ART

The use of a Nipkow disk with numerous pinholes formed in a radially spiraling pattern in a light-shielding member (e.g., a chromium film) formed on one side of a disk-shaped glass substrate in a confocal microscope has been proposed in the related art. In such a confocal microscope, the illuminating light is scanned onto the specimen under examination by rotating the Nipkow disk. There is a technology known in the related art (see, for instance, patent reference literature 1) adopted so as to prevent light having been reflected at the surface of the Nipkow disk from entering a detector, by setting the Nipkow disk at a tilt relative to the optical axis.

Patent Reference Literature 1: U.S. Pat. No. 4,927,254

DISCLOSURE OF THE INVENTION

Problems to be Solved by the Invention

A confocal microscope today is required to include an illuminating optical system and a measuring optical system that allow a wide visual field to be scanned all at once with a high level of resolution. In such a confocal microscope, the numerical aperture NA of the objective lens is increased and an NA equal to or close to the NA of the objective lens is achieved at a pinhole position at the Nipkow disk. A problem thus arises in that when the Nipkow disk is set at a tilt relative to the optical axis, as disclosed in the patent reference literature, coma aberration or a stigmatism occurs in the light from the specimen, having been transmitted through the Nipkow disk, which lowers the quality of the image obtained in the microscope and ultimately lowers the measurement accuracy.

Means for Solving the Problems

The optical element manufacturing method according to the present invention comprises; disposing a light-shielding layer that includes at least an Si layer as an uppermost layer, on a substrate used as a base member, forming an optical aperture at the light-shielding layer and forming a fine recession/projection structure at a surface of the uppermost layer through dry etching.

It is desirable that the Si layer be formed through thin-film vapor deposition and it is particularly desirable to form the Si layer through plasma CVD.

The fine recession/projection structure may be formed by covering the surface of the uppermost layer with a mask material constituted with fine particles with an etching rate lower than the etching rate of Si and dry etching the surface of the uppermost layer with the fine particles deposited on the surface of the uppermost layer acting as a mask.

Alternatively, the fine recession/projection structure may be formed by disposing a mask material with an etching rate lower than the etching rate of Si around the substrate on which the light-shielding layer is formed, dry etching the mask material so as to cover the surface of the uppermost layer with fine particles constituting the mask material and dry etching the uppermost layer of the light-shielding layer.

It is desirable that the mask material contains $Al_2O_3$, $SiO_2$ or a reaction product of $Al_2O_3$ or $SiO_2$. In addition, the mask material may constitute at least part of a supporting base which supports the substrate.

Furthermore, it is desirable to execute the dry etching by using (a) an etching gas containing at least one of tetrachloromethane, tetrachloroethylene, trichloroethylene, pentachloroethane, boron trichloride and chlorine, with an auxiliary gas such as oxygen or argon added therein as necessary or (b) a mixed etching gas constituted with a chlorine gas containing at least one of tetrachloromethane, tetrachloroethylene, trichloroethylene, pentachloroethane, boron trichloride and chlorine, and a fluorine gas containing at least one of tetra-fluoromethane, trifluoromethane, hexafluoroethane, octafluoropropane, fluorine and the like, with an auxiliary gas such as oxygen or argon mixed therein as necessary. In addition, it is desirable that the dry etching be executed through at least either RIE (reactive ion etching) or ICP (inductively-coupled plasma) etching.

The optical element according to the present invention comprises a substrate used as a base member and a light-shielding layer formed on the substrate and including a fine recession/projection structure formed through dry etching.

It is desirable that the light-shielding layer include at least an Si layer as an uppermost layer and that the fine recession/projection structure be formed at the Si layer. Also, the light-shielding layer may include an optical aperture through which the substrate is exposed.

The Nipkow disk according to the present invention comprises a substrate used as a base member, a light-shielding layer formed on the substrate that includes as an uppermost layer thereof an Si layer containing a fine recession/projection structure formed through dry etching, and a plurality of optical apertures that are formed at the light-shielding layer, and through which the substrate is exposed.

The confocal optical system according to the present invention comprises the Nipkow disk according to claim 13 as a scanning means for scanning a focus match position.

The 3-D measurement device according to the present invention comprises the Nipkow disk according to claim 13, a stage that supports a measurement object and an objective optical system disposed between the Nipkow disk and the stage.

ADVANTAGEOUS EFFECT OF THE INVENTION

The optical element according to the present invention, with a fine recession/projection structure formed through dry etching at the light-shielding layer formed on the substrate, achieves a high level of light-shielding effect. In addition, the extent of reflection at the Nipkow disk, obtained by forming optical apertures at the light-shielding layer, is greatly lowered. Furthermore, by using the Nipkow disk, a confocal optical system and a 3-D measurement device, both achieving a high level of accuracy, can be provided.

BRIEF DESCRIPTION OF THE DRAWINGS (FIG. 1) A plan view showing the structure of the Nipkow disk achieved in a first embodiment.

BEST MODE FOR CARRYING OUT THE INVENTION

The following is an explanation of embodiments of the present invention, given in reference to the drawings.

First Embodiment

Figure 1:
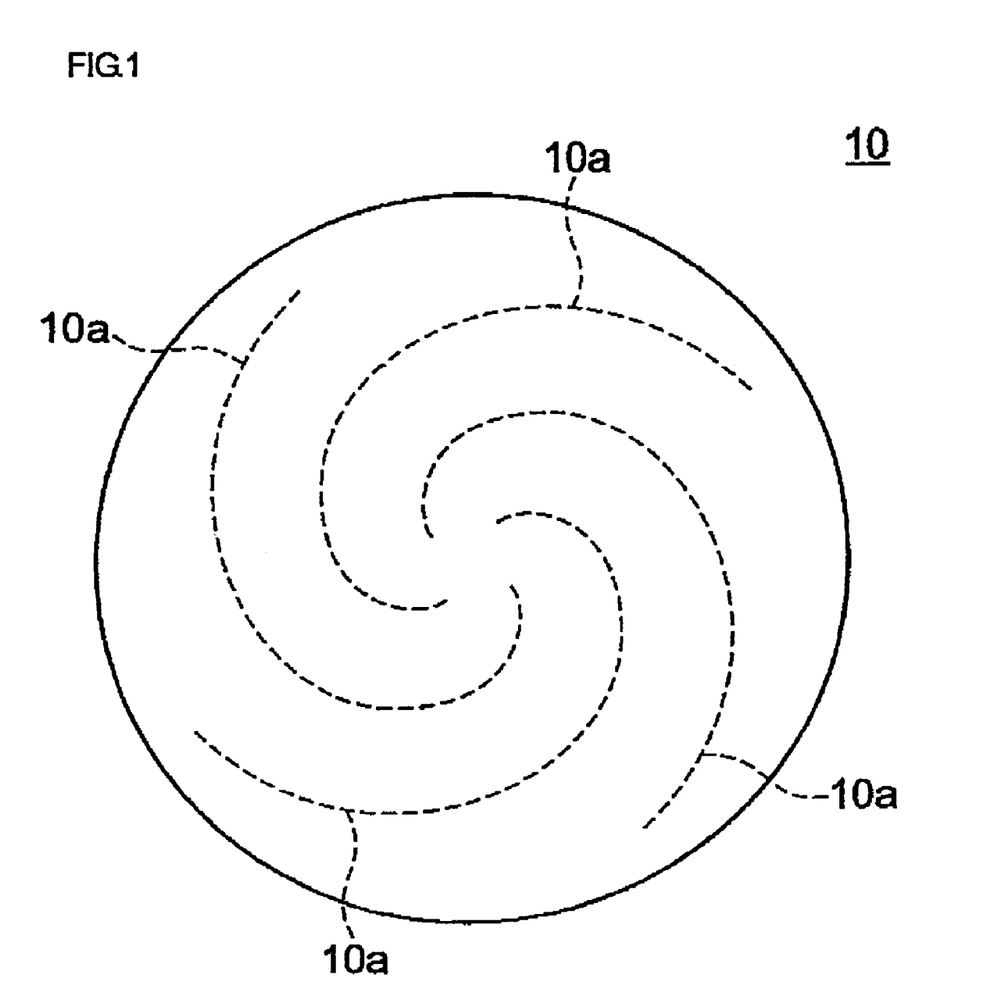

FIG. 1 is a plan view of a Nipkow disk achieved in the first embodiment of the optical element according to the present invention. As the figure clearly indicates, the Nipkow disk 10 is a shield, the overall outline of which forms a disk shape. The Nipkow disk 10 may be installed in, for instance, a confocal microscope. Although not shown, numerous very small pinholes with uniform diameter are formed with predetermined intervals along a plurality of radially spiraling loci 10a at the Nipkow disk 10. While four loci 10a along which the pinholes are to be formed are set in the example presented in the figure, specifications such as the quantity of loci 10a and the inclination of the loci can be adjusted as necessary to meet a specific requirement of a given application. In addition, instead of pinholes formed along the radially spiraling loci 10a, pinhole groups set in a two-dimensional array in a predetermined pattern may be used.

Figure 2:
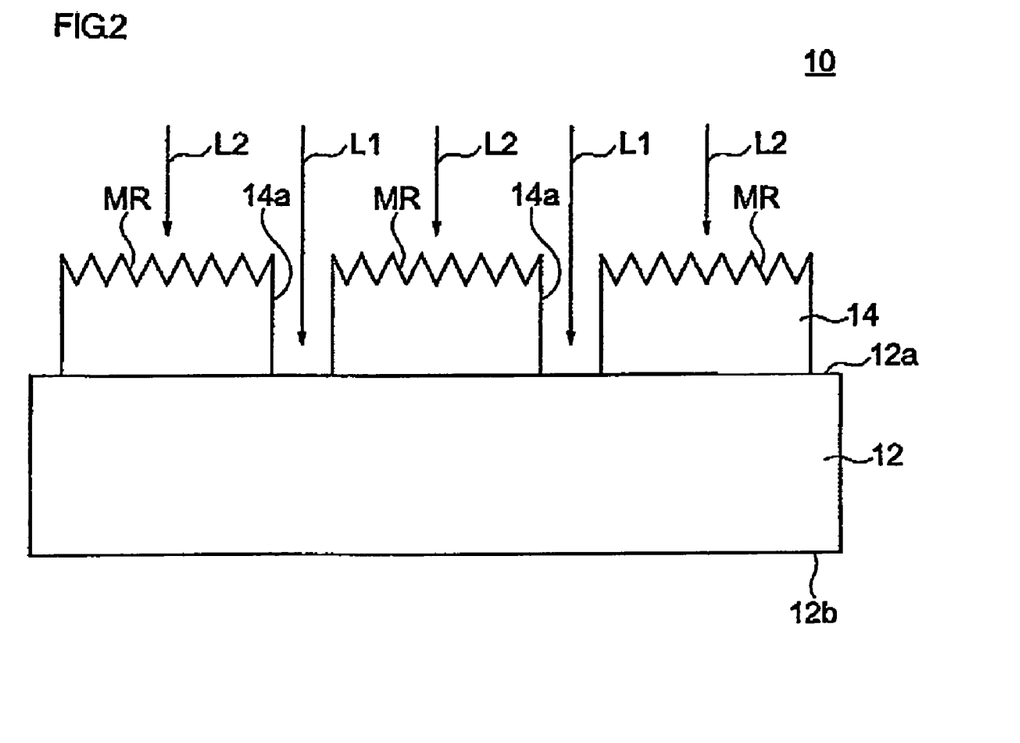
(FIG. 2) A sectional view of the structure adopted in the Nipkow disk in FIG. 1

FIG. 2 is a conceptual diagram showing a section of the Nipkow disk 10 in FIG. 1, taken from a side thereof. The Nipkow disk 10 includes a transparent disk-shaped glass substrate 12 and a light-shielding layer 14 constituted with a thin film formed on the glass substrate 12. Two surfaces 12a and 12b of the glass substrate 12 constituted of quartz glass are polished optical surfaces. The light-shielding layer 14 is constituted with a thin Si film, with numerous optical apertures 14a, each passing through the light-shielding layer 14, formed over optimal intervals at the light-shielding layer 14. It is to be noted that while a material other than quartz glass may be used to constitute the glass substrate 12, the glass substrate 12 should assure good transmissivity and a low coefficient of expansion.

The optical apertures 14a are round holes referred to as pinholes, which are set at positions conjugate with the positions of observation points on or inside the measurement object relative to the objective lens of the confocal microscope. The diameter of the optical apertures 14a, which is normally set to the Airy disk diameter, is set to approximately 10 μm in the embodiment, instead of, for instance, the 50 μm diameter typically set in the related art. It is to be noted that the optical apertures 14a such as those shown in FIG. 2 are arrayed over equal intervals along the loci 10a in FIG. 1.

A fine recession/projection (unevenness or irregularities) structure MR is formed at the surface of the uppermost layer in the light-shielding layer 14 by randomly processing the surface of the thin Si film. This fine recession/projection structure MR, formed by dry etching the surface of the light-shielding layer 14 through RIE (reactive ion etching) ICP (inductively-coupled plasma) etching or the like, is constituted with numerous small projections with a lateral width equal to or less than the wavelength of visible light, e.g., several nm~several hundred nm. It is to be noted that while the light-shielding layer 14 itself has an overall thickness of 3000~7000 Å in this embodiment, the thickness of the light-shielding layer may be adjusted as necessary in correspondence to specifications such as the brightness and the wavelength of the incident light.

Light beams L1 having entered the optical apertures 14a at the Nipkow disk 10 enter the transparent glass substrate 12 via the surface 12a and exit the glass substrate 12 via the opposite surface 12b. While the exact mechanism is not clear, most of light beams 12 having entered the fine recession/projection structure MR around the optical apertures 14a are assumed to pass through the fine recession/projection structure MR to be absorbed in the light-shielding layer 14. For instance, if Si is regarded as a dielectric material, the fine recession/projection structure MR can be thought of as a reflection-preventing (or reflection-reducing) layer from a macroscopic point of view, whereas if Si is regarded as a semi-metal material, the fine recession/projection structure MR can be thought of as an absorptive scattering layer.

The light beams L2 having entered the fine recession/projection structure MR functioning as a reflection-preventing (or reflection-reducing) layer, advance further into the light-shielding layer 14 via the fine recession/projection structure MR and become absorbed inside the light-shielding layer 14. When the thickness or the structural elements of the fine recession/projection structure MR is smaller than the wavelength of the light beams L2, the fine recession/projection structure MR can be regarded as an area where the refractive index changes continuously at the light-shielding layer 14 from the refractive index of the air to the refractive index of Si, and no reflection or scattering occurs at the interface between the fine recession/projection structure MR and the layer present underneath. For this reason, the light beams L2 having entered the light-shielding layer 14 from the outside can be assumed to advance via the fine recession/projection structure MR into the light-shielding layer 14 without any loss. It is to be noted that while the thin Si film constituting the light-shielding layer 14 allows infrared light to be transmitted to certain extent, its absorption band covers the visible range and thus, the thin Si film absorbs visible light beams with a high level of efficiency.

When the fine recession/projection structure MR functions as an absorptive scattering layer, on the other hand, with nonmetal surface characteristics, the fine recession/projection structure MR functions as a buffer layer for the light beams L2 having entered the fine recession/projection structure MR and thus, it is assumed that the light beams L2 are allowed to advance further inward or become scattered. As a result, regular reflection due to metallic luster does not occur and the quantity of light that is actually scattered is extremely small. Consequently, a reversal of light caused by regular reflection at the areas around the optical apertures 14a and the like does not occur at the Nipkow disk 10 achieved in the embodiment. This, ultimately, makes it possible to prevent occurrence of undesirable stray light. It is to be noted that if an $SiO_2$ film is formed through, for instance, natural oxidation at the surface of the fine recession/projection structure MR, a phenomenon similar to that in the latter case above is assumed to manifest to result in reduced reflection.

Figure 9:
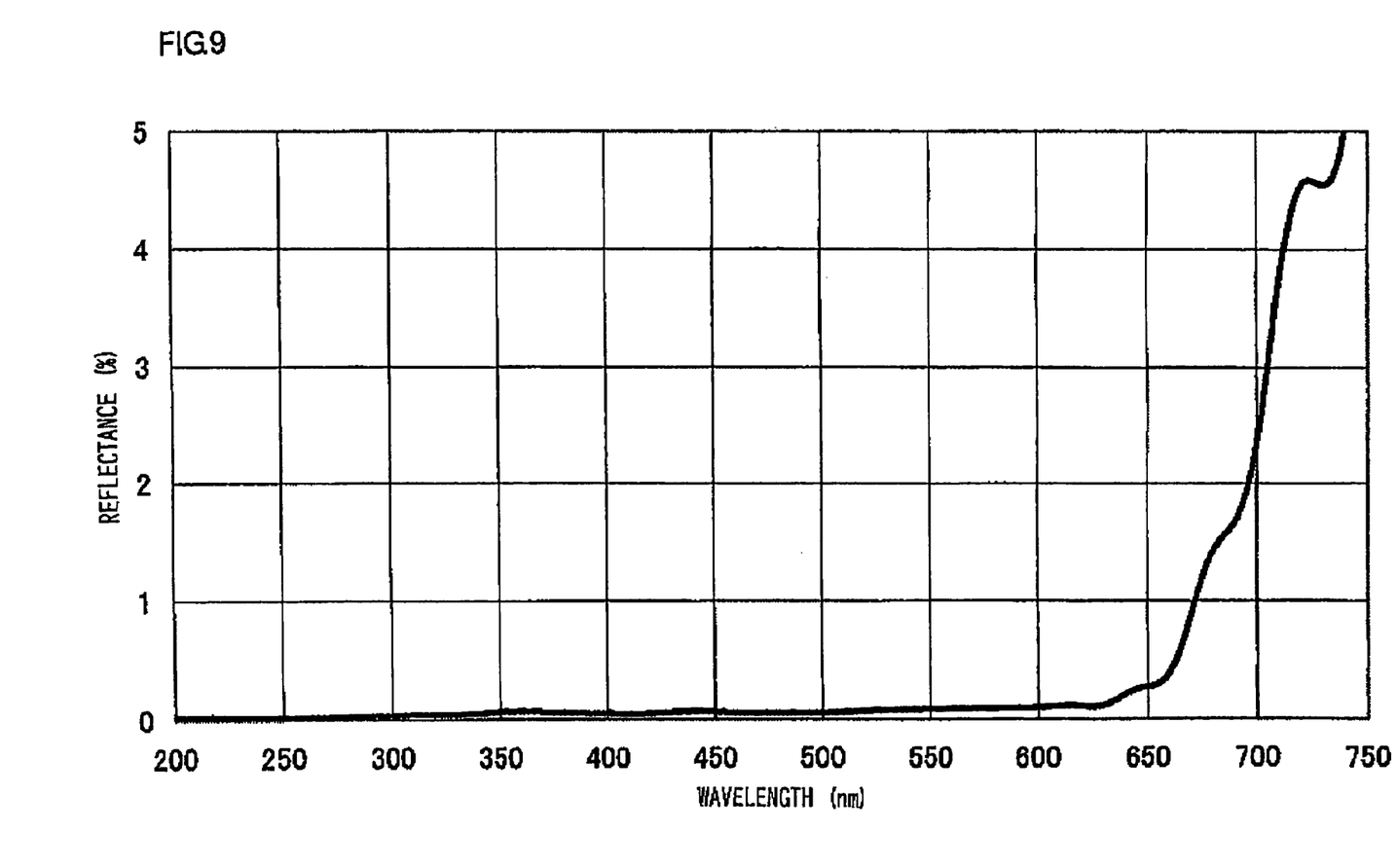
(FIG. 9) The reflectance characteristics of an Si film at which a fine recession/projection structure MR is formed.

FIG. 9 presents a graph of measurement values representing the reflectance characteristics manifesting at a fine recession/projection structure MR formed at an Si film with a thickness of 2.5 μm, with the wavelength indicated along the horizontal axis. The measurement was conducted over a wavelength range of 190 nm~800 nm. The reflectance at a wavelength of 630 nm or less is equal to or less than 0.2%. It is to be noted that as the earlier discussion on the fine recession/projection structure MR indicated, the light-shielding layer 14 may be constituted of a material other than Si, as long as the material achieves a relatively high level of absorption over the visible range, e.g., a semi-metal material.

Figure 3:
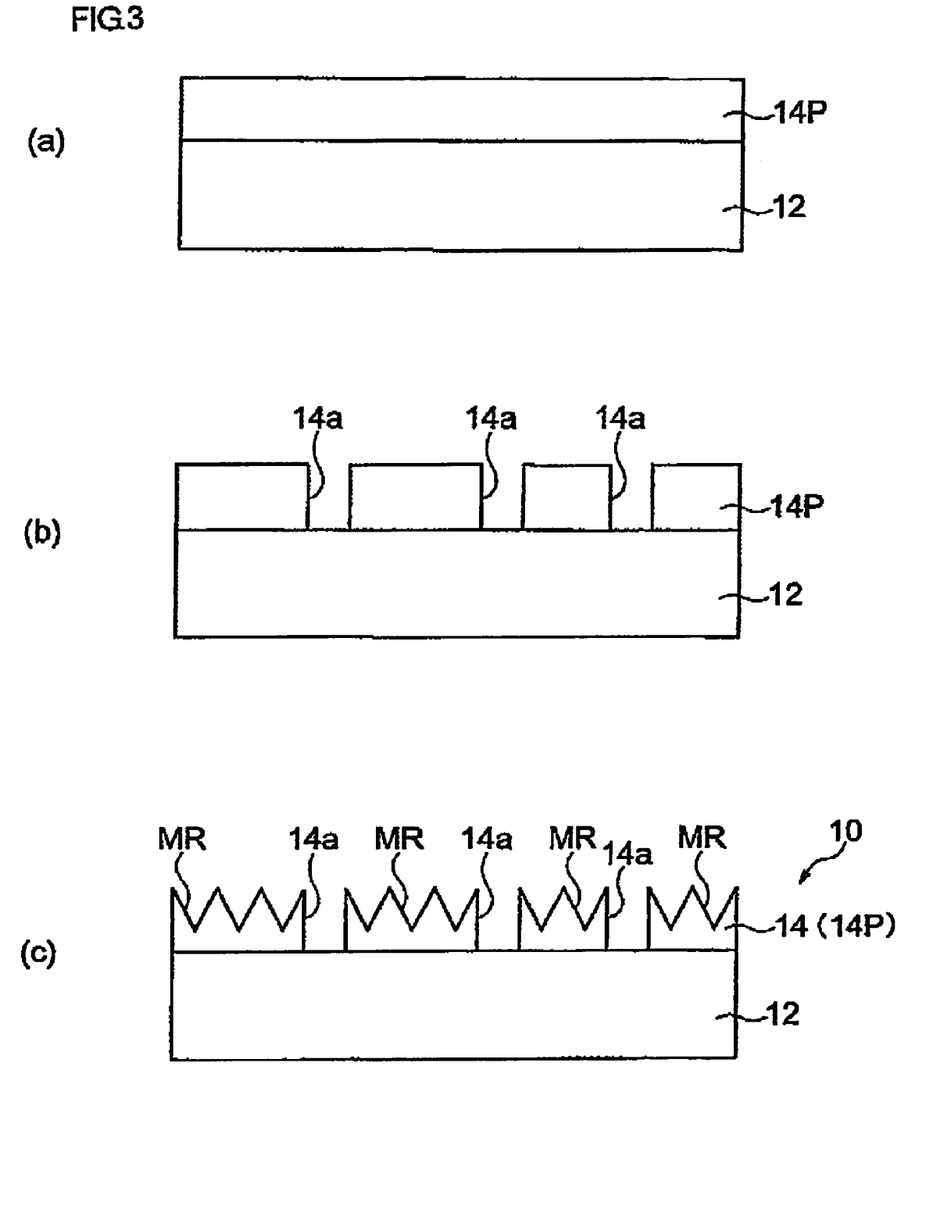
(FIG. 3) Steps through which the Nipkow disk in FIG. 2 is manufactured as illustrated in (a)~(c)

FIGS. 3(a)~3(c) illustrate a manufacturing method that may be adopted when manufacturing the Nipkow disk 10 shown in FIGS. 1 and 2.

As shown in FIG. 3(a), the transparent glass substrate 12 is prepared by grinding and polishing a disk-shaped quartz glass piece and then a thin Si film 14P is formed uniformly over the surface 12a of the glass substrate 12. The thin Si film 14P is formed by adopting a thin film deposition method, such as PVD (physical vapor deposition), e.g., sputtering film formation, or CVD (chemical vapor deposition), e.g., plasma CVD. Through sputtering film formation, Si is deposited onto the surface 12a of the glass substrate 12 set so as to face opposite an Si wafer, by sputtering the Si wafer within a vacuum device. Through such sputtering film formation, a non-transparent thin Si film 14P with a uniform thickness can be formed on the glass substrate 12. While the Si constituting the thin Si film 14P normally assumes an amorphous form, the crystalline characteristics of the Si may be enhanced through annealing or the like. In addition, the amorphous Si film formed through plasma CVD demonstrates highly superior characteristics with regard to the stress (reliable contact, stability), the uniformity of film thickness and the light-shielding performance.

More specifically, the manufacturing process was executed on the glass substrate 12 with a diameter of 100 mm, over which the Si film 142 with a thickness of 5000 Å was formed through sputtering.

Next, numerous optical apertures 14a are formed in a predetermined array pattern at the thin Si film 14P on the glass substrate 12, as shown in FIG. 3(b). When forming the optical apertures 14a, a resist pattern with openings formed at positions corresponding to the positions at which the optical apertures 14a are to be formed is formed over the thin Si film 14P. Then, the optical apertures 14a, each passing through the thin Si film 14P, are formed through anisotropic dry etching such as RIE (reactive ion etching) by using the resist pattern as a mask, and subsequently, the resist mask is removed so as to expose the thin Si film 14P.

During the actual manufacturing process, the resist was first applied onto the thin Si film 14P and a resist pattern was formed through contact exposure and development executed on the resist by using a photo mask with pattern circles having a 7 μm diameter. Then, the glass substrate 12 with the resist pattern formed thereupon was fed into an RIE dry etching apparatus, the thin Si film 14P was dry etched at positions corresponding to the resist openings with a mixed gas containing $ChF_3$ and $SF_5$ until the glass substrate 12 became exposed, thereby forming the optical apertures 14a. The etching process was executed under the following etching conditions; the degree of vacuum set to, for instance, 1 Pa, the RIE power set to 600 W and the etching duration set to 15 minutes. Subsequently, the residual gas remaining in the RIE dry etching apparatus was evacuated, and the resist remaining at the surface of the thin Si film 14P was removed through etching by using oxygen gas. This etching process was executed under the following etching conditions of the degree of vacuum set to, for instance, 20 Pa, the RIE power set to 600 W and the etching duration set at 5 minutes.

Lastly, special dry etching to be detailed later is executed on the thin Si film 14P to form the fine recession/projection structure MR at the surface of the thin Si film 14P, and thus, the formation of the light-shielding layer 14 is completed, as shown in FIG. 3(c).

Figure 4:
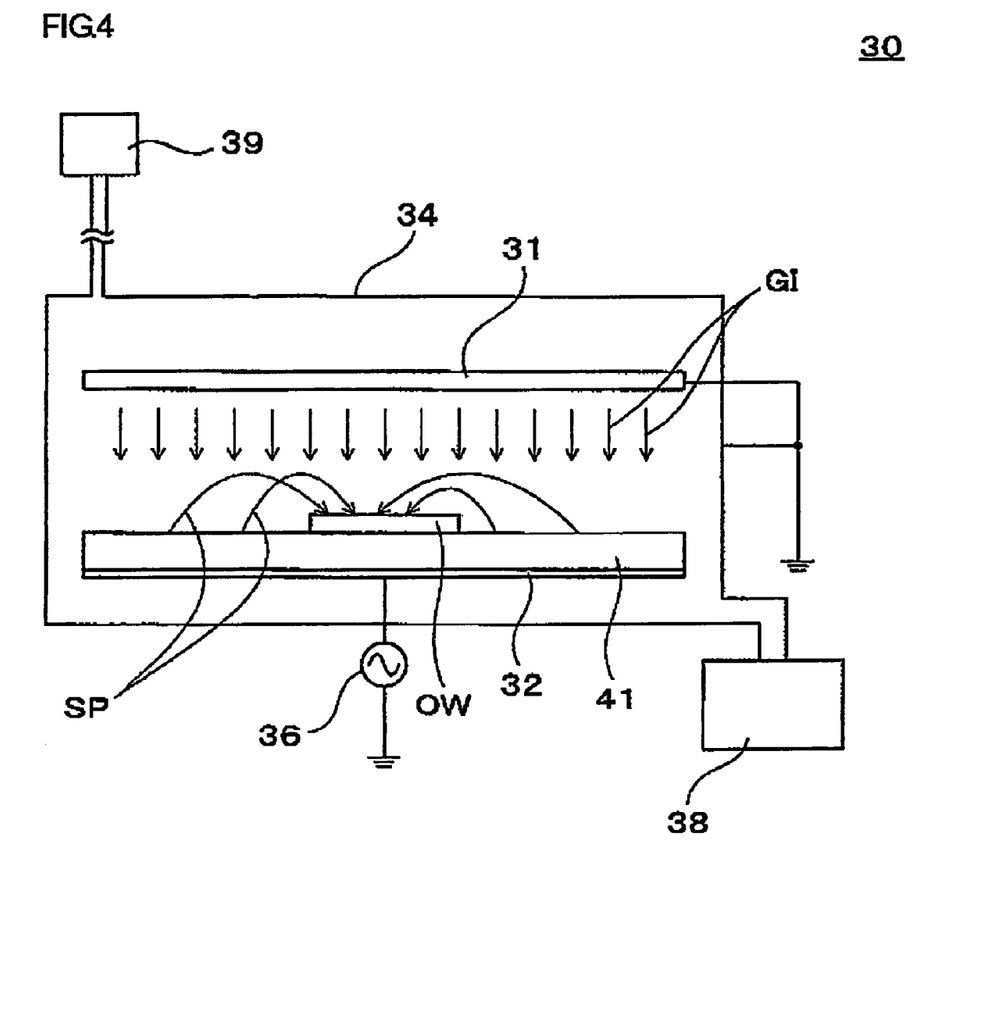
(FIG. 4) The structure adopted in the reflection-preventing layer manufacturing apparatus engaged in operation during the step shown in FIG. 3(a)

FIG. 4 is a conceptual diagram showing the structure adopted in a reflection preventing layer manufacturing apparatus that may be utilized in the production of the Nipkow disk 10 shown in FIG. 2 and the like. A reflection preventing layer manufacturing apparatus 30, adopting a basic structure similar to that of an RIE apparatus, includes an anode electrode 31 connected to the ground, a cathode electrode 32 to which high frequency power to be used to raise a reaction gas to plasma is applied, and a vacuum chamber 34 in which the electrodes 31 and 32 are housed. The cathode electrode 32 is connected to an AC voltage source 36 that generates a specific level of high-frequency voltage necessary for the generation of plasma from the reaction gas and for the formation of the fine recession/projection structure.

The potential at the vacuum chamber 34 is set equal to the ground potential, as is the potential at the anode electrode 31. The pressure inside the vacuum chamber 34 is sustained at an optimal degree of vacuum via a vacuum pump 38. A reaction gas source 39 is a gas source from which the reaction gas is supplied into the vacuum chamber 34. By supplying the reaction gas into the vacuum chamber 34 at a specific flow rate, the concentration of the reaction gas in the vacuum chamber 34 can be set to a desired level. The reaction gas supplied from the reaction gas source 39 may be an etching gas containing at least one of; tetrachloromethane ($CCl_4$), tetrachloroethylene, trichloroethylene, pentachloroethane, boron trichloride and chlorine, with an auxiliary gas such as oxygen or argon added therein as necessary. Alternatively, the reaction gas may be a mixed etching gas constituted with a chlorine gas containing at least one of; tetrachloromethane, tetrachloroethylene, trichloroethylene, pentachloroethane, boron trichloride and chlorine, and a fluorine gas containing at least one of; tetrafluoromethane, trifluoromethane, hexafluoroethane, octafluoropropane and fluorine, with an auxiliary gas such as oxygen or argon added therein as necessary.

A disk-shaped tray 41, constituted of alumina, is placed on the cathode electrode 32, and an optical member OW to be manufactured into the Nipkow disk 10, is set on the tray 41. The tray 41 functions as a supporting base for the optical member OW and also functions as a mask material with a low etching rate, as described later. The state of the optical member OW prior to the processing start corresponds to that shown in FIG. 3(b) with the thin Si film 14P formed over the glass substrate 12. The upper surface of the thin Si film 14P of the optical member OW set on the tray 41 is etched as ions created in the plasma and accelerated between the two electrodes 31 and 32 enter the thin Si film 14P.

During a regular etching process, the upper surface of the thin Si film 14P will be etched uniformly with specific anisotropy along a direction perpendicular to the upper surfaces of the two electrodes 31 and 32. According to the present invention, as the tray on which the optical member OW is placed becomes sputtered and etched with the ions of the reaction gas, very small sputter particles originating from the tray 41 constituted with alumina ($Al_2O_3$) become randomly deposited on the surface of the optical member OW. If a reaction gas constituted with an etching gas such as $CCl_4$ is used, the sputter particles SP having become randomly deposited on the surface of the optical member OW form and function as a mask due to a higher sputtering rate of Si than the sputtering rate of alumina. As a result, random projections are formed over the entire surface of the optical member OW due to the difference between the etching rate over the areas where the sputter particles SP are present and the etching rate over the area where no sputter particles are present.

In the apparatus shown in FIG. 4, the tray 41 is constituted of alumina, which is a sputtering material, and thus, the tray 41 can be used both as the supporting base for supporting the optical member OW and a sputtering material to be used to generate sputter particles SP to function as a mask. As a result, an optical element manufacturing apparatus with a simplified structure can be provided to achieve a reduction in the apparatus cost.

Figure 5:
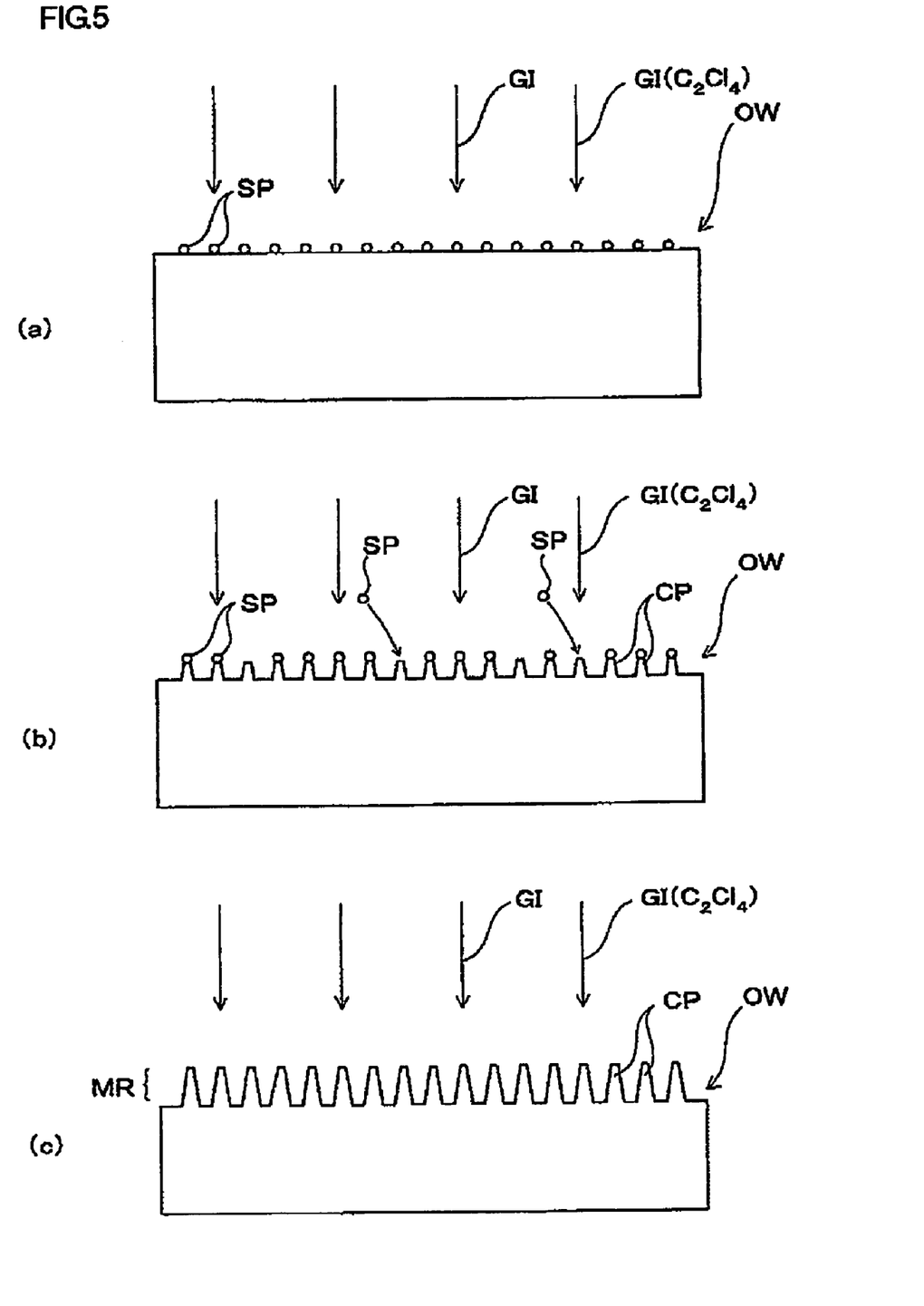
(FIG. 5) steps through which a reflection-preventing layer is formed by utilizing the apparatus in FIG. 4 as illustrated in (a)-(c)

FIGS. 5(a)~5(c) illustrate the concept of the formation of the fine recession/projection structure MR achieved in the apparatus shown in FIG. 4. It is to be noted that FIG. 5(a) shows an initial phase in the formation of the fine recession/projection structure MR, that FIG. 5(b) shows a middle phase in the formation of the fine recession/projection structure MR and that FIG. 5(c) shows a final phase in the formation of the fine recession/projection structure MR.

During the initial phase shown in FIG. 5(a), the surface of the tray 41, as well as the surface of the optical member OW, is sputtered and etched and thus, innumerable sputter particles SP, i.e., very fine alumina particles, originating from the tray 41 travel toward the optical member OW constituted of Si and are randomly deposited on the surface of the optical member OW. It is to be noted that while the figure shows the sputter particles SP distributed uniformly, the sputter particles are actually randomly deposited in an irregular distribution.

During the middle phase shown in FIG. 5(b), the sputter particles SP having become deposited on the surface of the optical member OW function as a mask and thus, the process of anisotropic etching achieved with ions GI from the reaction gas progresses over areas where sputter particles SP are not present, forming innumerable conical projections CP at positions corresponding to the positions of the sputter particles SP. It is to be noted that since the sputter particles SP present at the surface of the optical member OW, too, are etched with the ions GI albeit at an etching rate lower than the etching rate of the optical member OW, the tips of the projections CP are gradually exposed. However, as another sputter particle SP tends to be readily deposited at the tip of each projection CP, the projections CP as a whole gradually grow as a result.

During the final phase shown in FIG. 5(c), the projections CP grown to a nanometer-order size are present randomly and densely at the upper layer of the optical member OW. The upper layer where numerous projections CP are formed as described above constitutes the fine recession/projection structure MR, which is to function as a reflection-preventing (or reflection-reducing) layer and the like in the microscopic sense, as explained earlier.

In the actual implementation of the method, the step shown in FIG. 3(c) was executed by dry etching the thin Si film 14P with the reaction gas constituted with a mixed gas containing tetrachloroethylene, trifluoromethane and oxygen with the flow rate of the tetrachloroethylene set to 10 scam, the flow rate of the trifluoromethane set to 5 scan and the flow rate of the oxygen set to 5 sccm, while holding the pressure inside the vacuum chamber 34 at 2 Pa. The RIE power was set at 800 W and the etching duration was set at 5 minutes. The microscopic observation of the resulting fine recession/projection structure MR indicated that the thin Si film 14P formed on the substrate 12 had become completely black and that very fine needle-like projections were formed to constitute the fine recession/projection structure MR at the surface of the thin Si film 14P. Measurement of the reflectance of the Nipkow disk 10 manufactured as described above indicated that the reflectance over the visible range was equal to or less than 0.1% and the transmittance over the visible range was equal to or less than 0.01%. In other words, since the reflectance achieved with a Nipkow disk in the related art, which includes a light-shielding layer constituted with multilayered films formed by using chromium or chromium oxide, is 1~5%, a reduction in the reflectance by at least a factor of 0.1 was achieved by adopting the embodiment.

Second Embodiment

The following is an explanation of the Nipkow disk achieved in the second embodiment. In the description of the Nipkow disk achieved in the second embodiment, which is a variation of the Nipkow disk in the first embodiment, the same reference numerals are assigned to identical parts so as to preclude the necessity for a repeated explanation thereof. In addition, any part that is not specially mentioned is identical to the corresponding part in the first embodiment.

Figure 6:
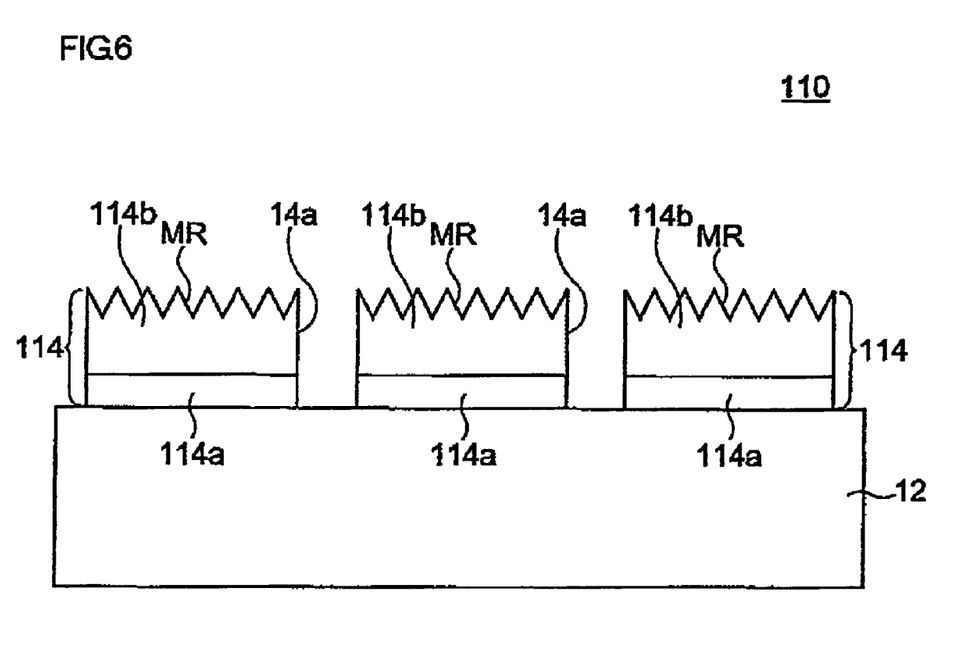
(FIG. 6) A sectional view of the structure adopted in the Nipkow disk achieved in a second embodiment.

FIG. 6 is a sectional view, conceptually illustrating the Nipkow disk achieved in the second embodiment. A Nipkow disk 110 comprises a glass substrate 12 and a light-shielding layer 114. The light-shielding layer 114 includes a base layer 114a constituted of chromium (Cr) or chromium oxide ($Cr_2O_3$) and a main layer 114b constituted with a thin Si film, with numerous optical apertures 14a, each passing through the layers 114a and 114b, formed over optimal intervals.

A fine recession/projection structure MR is formed at the surface of the main layer 114b, which is the uppermost layer in the light-shielding layer 114, by randomly processing the surface of the Si layer. The fine recession/projection structure MR, formed by dry etching (e.g., RIE) the surface of the main layer 114b, which is the top layer in the light-shielding layer 114, includes numerous very small projections with widths in a range between several nanometers and several hundred nanometers. Light beams having entered the fine recession/projection structure MR around the optical apertures 14a mostly pass through the fine recession/projection structure MR to become absorbed in the main layer 114b and even light beams having been transmitted through the main layer 114b are almost completely absorbed and reflected at the base layer 114a.

Figure 7:
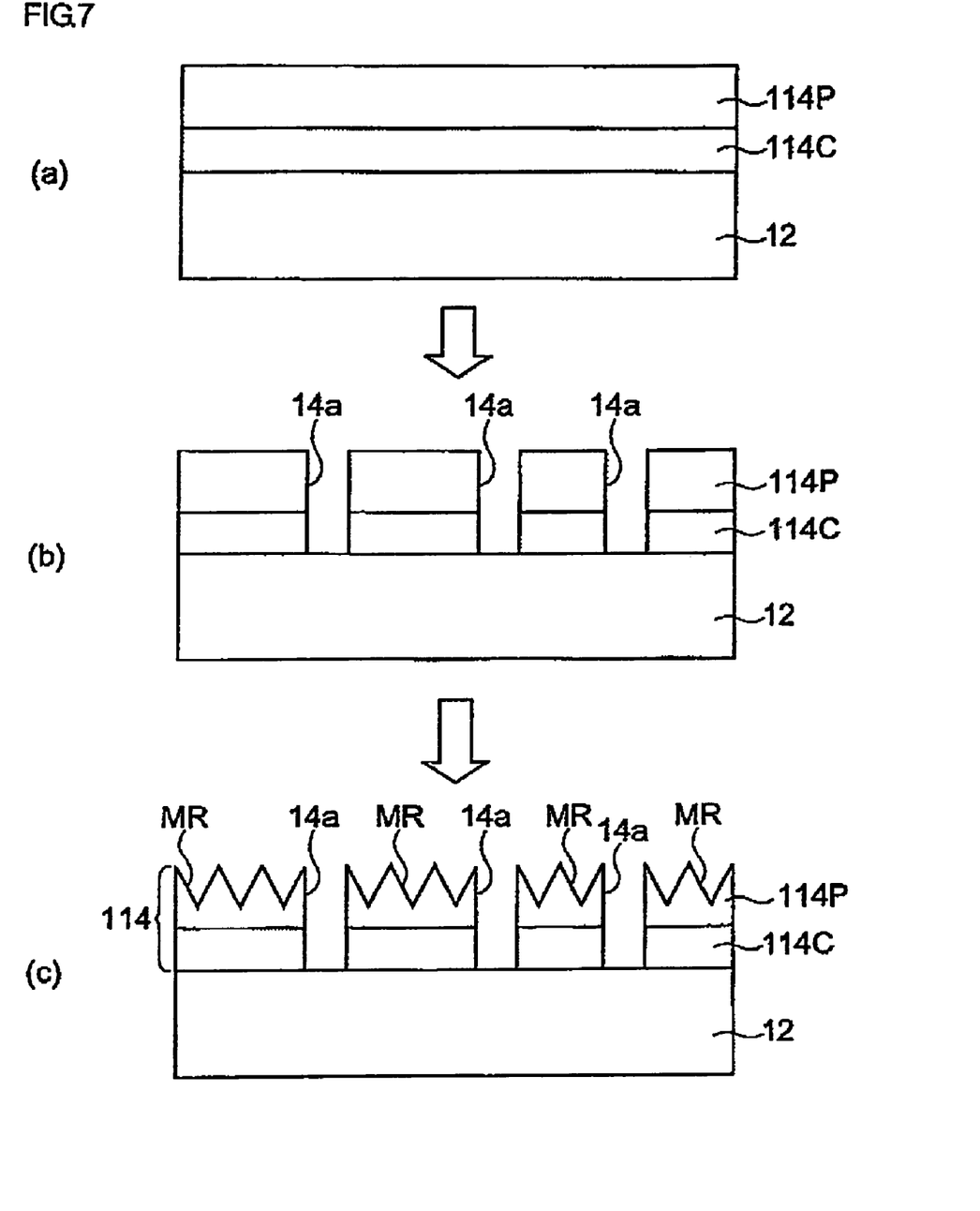
(FIG. 7) Steps through which the Nipkow disk in FIG. 6 is manufactured as illustrated in (a)~(c)

FIGS. 7(a)~7(c) illustrate a manufacturing method that may be adopted when manufacturing the Nipkow disk 110 shown in FIG. 6. The glass substrate 12 is first prepared, a chromium-containing layer 114C containing chromium or chromium oxide is uniformly formed over the surface 12a of the glass substrate 12 and then a thin Si film 114P is formed uniformly over the chromium-containing layer, as shown in FIG. 7(a). The chromium-containing layer 114C and the thin Si film 114P may be formed through, for instance, sputtering film formation.

Next, the optical apertures 14a achieving a predetermined array pattern are formed at the chromium-containing layer 114C and the thin Si film 114P on the glass substrate 12. The optical apertures 14a are formed by first forming a resist pattern, with openings present at the positions corresponding to the positions at which the optical apertures 14a are to be formed, over the thin Si film 114P. Then, the thin Si film 114P is anisotropically dry etched (e.g., RIE) by using the resist pattern as a mask, thereby forming the optical apertures 14a passing through the thin Si film 114P, with the chromium-containing layer 114C exposed at the bottoms thereof. Next, wet etching is executed by using the resist and the thin Si film 114P as a mask so as to allow the optical apertures 14a to pass through the chromium-containing layer 114C, thereby completing the formation of the optical apertures 14a. Subsequently, the resist mask present over the thin Si film 114P is removed.

Lastly, the surface of the thin Si film 114P is dry etched and the fine recession/projection structure MR is thus formed over the thin Si film 114P, thereby completing the formation of the light-shielding layer 114, as shown in FIG. 7(c).

In the actual implementation of the manufacturing process, a glass substrate 12 with a 100 nm diameter was prepared, and a chromium-containing layer (a metal Cr layer in this case) 114C with a thickness of 1000 Å and an Si film 114P with a thickness of 5000 Å were formed over the glass substrate 12 through sputtering. A resist pattern was then formed and openings were formed at the thin Si film 114P by using an RIE dry etching apparatus in a manner similar to that having been explained in reference to the first embodiment.

Next, the Cr layer, i.e., the chromium-containing layer 114C, was etched through a wet etching process. The etching process was executed by using a liquid mixture containing cerium ammonium nitrate, perchloric acid and demineralized water and the etching process lasted for one minute. The residual resist having remained on the surface was removed and then the fine recession/projection structure MR was formed at the surface of the thin Si film 114P, as has been explained in reference to the actual manufacturing process implemented in the first embodiment. The microscopic observation of the resulting fine recession/projection structure MR indicated that the light-shielding layer 114, i.e. the thin Si film 114P formed on the substrate 12 had become completely black and that very fine needle-like projections were formed to constitute the fine recession/projection structure MR at the surface of the thin Si film 14P. Measurement of the reflectance of the Nipkow disk 110 manufactured as described above indicated that the reflectance over the visible range was equal to or less than 0.1% and the transmittance over the visible range was equal to or less than 0.001%. In other words, a reduction in the reflectance by at least a factor of 0.1 was achieved by adopting the embodiment.

Third Embodiment

Figure 8:
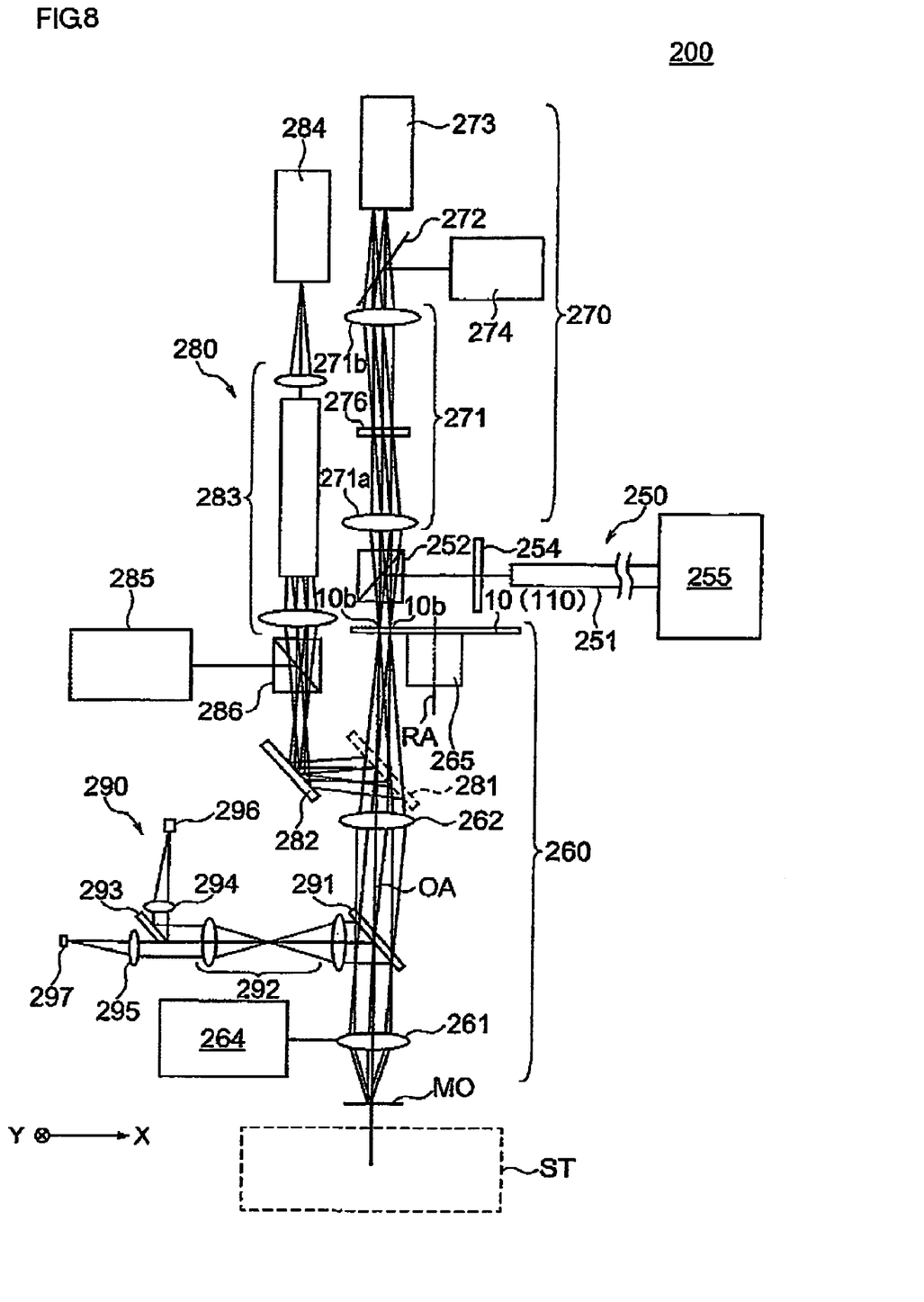
(FIG. 8) A schematic illustration showing the structures adopted in a confocal optical system and a 3-D measurement device equipped with a Nipkow disk such as that shown in FIG. 1.

FIG. 8 shows the structure adopted in a 3-D measurement device in which the Nipkow disk achieved in the first embodiment or the second embodiment is installed.

A 3-D measurement device 200 comprises an epi-illumination light source 250 that provides illuminating light to be used to illuminate a measurement object MO placed on a stage ST, an epi-illumination confocal optical system 260 that condenses the illuminating light from the epi-illumination light source 250 onto the measurement object MO and extracts light reflected from the measurement object MO, an imaging device 270 that photographs an image formed with the reflected light extracted via the epi-illumination confocal optical system 260, an observation optical system 280 that enables camera observation of a stereoscopic image of the measurement object MO and a laser AF system 290 engaged in focus adjustment for image seen through the camera.

The epi-illumination light source 250, which includes a built-in mercury lamp to be used as a light source, guides the illuminating light originating from the lamp device 255 to a polarization beam splitter 252 via a fiber 251. It is to be noted that a polarizing plate 254, which adjusts the illuminating light polarization along a specific direction, is disposed between the fiber 251 and the polarization beam splitter 252.

The epi-illumination confocal optical system 260 includes a first objective lens 261 and a second objective lens 262 constituting a both-side telecentric objective optical system and a Nipkow disk 10 (110) which rotates at a constant speed. The first objective lens 261, disposed on the side toward the measurement object MO, can be displaced to the optimal position along the optical axis OA via a focal point-shifting mechanism 264. The second objective lens 262 condenses image light collimated by the first objective lens 261 onto a light-shielding layer of the Nipkow disk 10 (100) with the optimal magnification factor. The Nipkow disk 10 (100), which is the Nipkow disk having been explained in reference to either the first embodiment or the second embodiment, functions as a scanning means in the epi-illumination confocal optical system 260.

The Nipkow disk 10 (100), disposed perpendicular to the optical axis OA so as to align the normal line of the disk with the optical axis OA, rotates around a rotational axis RA, extending parallel to the optical axis OA, at a constant speed as it is driven by a drive device 265. Pinholes 10b (equivalent to the optical apertures 14a in FIG. 2) formed at the Nipkow disk 10 (110) are set at positions conjugate with the position of the measurement object MO. Thus, the XY section of the measurement object MO is scanned with numerous condensed light spots and light reflected at the condensed light spots passes through the pinholes 10b to be guided toward the imaging device 270. An XY section image of the measurement object MO is thus obtained as a result.

It is to be noted that while the first objective lens 261 and the second objective lens 261 are disposed so as to achieve a both-side telecentric system in the embodiment, a one-side telecentric optical system may be utilized instead and the image-forming magnification factor of such a monocular telecentric optical system, too, can be set freely so as to suit specific purposes of use.

The imaging device 270 comprises a projection system 271 that projects the image via the pinholes 10b formed at the Nipkow disc 10 at, for instance, a magnification factor of 1, the half mirror 272 disposed at a stage to the rear of the projection system 271, a high sensitivity camera 273 disposed on the optical path of light advancing straight via the half mirror 272 and a low sensitivity camera 274 disposed on an optical path of light redirected at the half mirror 272. The projection system 271 is a both-side telecentric system which includes a pair of lenses 271a and 271b, with a polarization plate 276 for extracting part of the observation light, which is polarized along a specific direction, disposed between the two lenses 271a and 271b. The high sensitivity camera 273 is used to observe the scanned image of the measurement object MO obtained via the Nipkow disk 10 (100) and the like at a high level of sensitivity, whereas the low sensitivity camera 274 is used to observe the scanned image of the measurement object MO obtained via the Nipkow disk 10 (100) and the like at a low level of sensitivity.

The observation optical system 280 comprises a forward/backward mirror 281 disposed on the optical axis OA of the epi-illumination confocal optical system 260 so as to be allowed to move forward and backward, an optical path bending mirror 282 that is fixed at a permanent position, a zoom optical system 283 used for magnification factor adjustment, a bright field camera 284 used for bright field observation, a coaxial illumination device 285 used for bright field observation and a beam splitter 286 that guides bright field illuminating light onto the observation optical path. With the forward/backward mirror 281 disposed on the optical axis OA, the magnification factor for the stereoscopic image of the measurement object MO can be altered by adjusting the zoom optical system 283 while observing the image with the bright field camera 284.

The laser AF system 290 comprises a half mirror 291, a relay system 292, a splitter mirror 293, a pair of lenses 294 and 295 and a pair of sensors 296 and 297. By monitoring the outputs from the pair of sensors 296 and 297, the state of focus on the measurement object MO can be detected and as the first objective lens 261 is displaced by the optimal extent via the focal point shifting mechanism 264, the focus match state can be sustained.

The operation executed in the device shown in FIG. 8 is now explained. Light emitted from the epi-illumination light source 250 is reflected at the polarization beam splitter 252 and is radiated onto the Nipkow disk 10 (110). This light then passes through the pinholes 10b (corresponds to the optical apertures 14a in FIG. 2) at the Nipkow disk 10 (110) and is condensed onto the measurement object MO via the objective lenses 261 and 262. Light reflected from the measurement object MO passes through the pinholes 10b at the Nipkow disk 10 (110) again via the objective lenses 261 and 262. The reflected light passes through the same pinholes 10b as the pinholes 10b through which the illuminating light having been condensed onto the measurement object MO has previously passed. The light having passed through the pinholes 10b at the Nipkow disk 10 (110) as described above is transmitted through the polarization beam splitter 252 and forms an image on the imaging surfaces of the cameras 273 and 274 via the projection system 271.

During this process, the Nipkow disk 10 (110) is rotationally driven by the drive device 265, and thus, the illuminating spot lights guided to the measurement object MO is scanned over the measurement object MO within the XY plane. Images of the entire measurement object MO within the scanning range described above are obtained through integration at the cameras 273 and 274. By displacing the first objective lens 262 via the focal point shifting mechanism 264 during the image detection, the measurement object MO can be sectioned, and through analysis of the images thus obtained, the three-dimensional characteristics distribution and the shape of the measurement object MO can be determined.

Since the Nipkow disk 10 (100), which does not readily reflect light, is used, noise is less likely to be introduced into the observation light detected via the high sensitivity camera 273 and the like in the 3-D measurement device 200 described above. As a result, measurement can be executed with a high level of accuracy by using, for instance, a tomographic image of the measurement object MO. In addition, since the focus match position gradually changes along the up/down direction as the first objective lens 261 is gradually displaced via the focal point shifting mechanism 264, an accurate 3-D image constituted with tomographic images extracted at varying positions along the depthwise direction can be obtained with ease.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention. For instance, while an explanation is given above on examples in which the optical element according to the present invention is embodied as a Nipkow disk, the present invention is not limited to these examples and it may be adopted in various types of masks and apertures that include a light-shielding layer or a shielding layer formed in a specific pattern on a transparent substrate.

In addition, while an explanation is given above in reference to an embodiment on an example in which the light-shielding layer 14 constituted of Si is formed on the glass substrate 12 constituted of $SiO_2$, a thin Si film may be formed on a substrate constituted of quartzite or fluoride glass, optical apertures may be formed at this thin Si film and a fine recession/projection structure may be formed at the surface of the light-shielding layer constituted with the thin Si film instead. This alternative structure, too, reduces the reflected light from the light-shielding layer.

Furthermore, the fine recession/projection structure MR is formed at the surface of the light-shielding layer 14 by placing the glass substrate 12 on the tray 41 constituted with an alumina plate and using sputter particles from the tray 41 as a mask in the embodiment. However, a material other than alumina may be used as a mask material when forming the fine recession/projection structure MR, as long as its etching rate is lower than that of Si. For instance, sputter particles or reaction products of $SiO_2$ may be used as a mask when forming the fine recession/projection structure MR at the surface of the thin Si film. Moreover, the confocal microscope may adopt a structure other than that explained in reference to the embodiment.

INCORPORATION BY REFERENCE

The disclosure of the following priority application is herein incorporated by reference:

Japanese Patent Application No. 2004-312805 filed Oct. 27, 2004

The invention claimed is:

1. An optical element manufacturing method comprising:
   disposing a light-shielding layer that includes at least an Si layer as an uppermost layer, on a substrate used as a base member;
   forming an optical aperture at the light-shielding layer; and
   forming a recession/projection structure at a surface of the uppermost layer through dry etching.

2. An optical element manufacturing method according to claim 1, wherein:
   the light-shielding layer is disposed on the substrate by forming the Si layer through thin-film vapor deposition.

3. An optical element manufacturing method according to claim 2, wherein:
   the Si layer is formed through plasma CVD.

4. An optical element manufacturing method according to claim 1, wherein:
   the recession/projection structure is formed by covering the surface of the uppermost layer with a mask material constituted with particles with an etching rate lower than the etching rate of Si and dry etching the surface of the uppermost layer with the particles deposited on the surface of the uppermost layer acting as a mask.

5. An optical element manufacturing method according to claim 1, wherein:
   the recession/projection structure is formed by disposing a mask material with an etching rate lower than the etching rate of Si around the substrate on which the light-shielding layer is formed, dry etching the mask material so as to cover the surface of the uppermost layer with particles constituting the mask material, and dry etching the uppermost layer of the light-shielding layer.

6. An optical element manufacturing method according to claim 5, wherein:
   the mask material constitutes at least part of a supporting base that supports the substrate.

7. An optical element manufacturing method according to claim 4, wherein:
   the mask material contains $Al_2O_3$ or $SiO_2$, or a reaction product of $Al_2O_3$ or $SiO_2$.

8. An optical element manufacturing method according to any one of claims 1 through 7, wherein:
   an etching gas used for dry etching contains at least one of tetrachloromethane, tetrachloroethylene, trichloroethylene, pentachloroethane, boron trichloride and chlorine.

9. An optical element manufacturing method according to claim 1, wherein
   an etching gas used for dry etching is a mixed gas constituted with: a chlorine gas containing at least one of tetrachloromethane, tetrachloroethylene, trichloroethylene, pentachloroethane, boron trichloride and chlorine; and a fluorine gas containing at least one of tetra-fluoromethane, trifluoromethane, hexafluoroethane, octafluoropropane and fluorine, with oxygen added therein.

10. An optical element manufacturing method according to claim 1, wherein:
    dry etching is executed through at least either RIE (reactive ion etching) or ICP (inductively coupled plasma) etching.

* * * * *